United States Patent [19]

Baba

[11] 4,078,446

[45] Mar. 14, 1978

[54] CONTROL MECHANISM

[75] Inventor: Masanao Baba, Takarazuka, Japan

[73] Assignee: Nippon Cable System, Inc., Japan

[21] Appl. No.: 656,885

[22] Filed: Feb. 10, 1976

[30] Foreign Application Priority Data

Sep. 10, 1975 Japan ............................... 50-110257

[51] Int. Cl.$^2$ ......................... G05G 9/00; F16D 23/00

[52] U.S. Cl. .................................. 74/471 R; 192/.096

[58] Field of Search ............................ 192/.096, .098; 74/471 R, 54, 567

[56] References Cited

U.S. PATENT DOCUMENTS

| | | | |
|---|---|---|---|
| 621,193 | 3/1899 | Wilson | 74/471 |
| 1,979,195 | 10/1934 | Govare et al. | 74/567 |
| 2,957,352 | 10/1960 | Pierce | 192/.098 |
| 3,101,821 | 8/1963 | Henry | 192/.096 |
| 3,134,269 | 5/1964 | Shimanckas | 192/.096 |

*Primary Examiner*—Benjamin W. Wyche
*Assistant Examiner*—Wesley S. Ratliff, Jr.
*Attorney, Agent, or Firm*—Armstrong, Nikaido & Marmelstein

[57] ABSTRACT

A control mechanism for controlling the operation of both the clutch and throttle of an engine by a single main lever, which comprises a lever means, a clutch operating means having a clutch member and a sliding member; a throttle operating means having a throttle member and a sliding member; a standing means having a standing clutch guide means, along which the sliding member of the clutch operating means slides, and a standing throttle guide means, along which the sliding member of the throttle operating means slides; and a rotatable means having a rotatable clutch guide means, along which the sliding member of the clutch operating means slides, and a rotatable throttle guide means, along which the throttle operating means slides. The control mechanism assures that the throttle is held out of operation until the clutch is completely shifted, while the clutch is held in the shifted position during the operation of the throttle, and has particular relevance to controlling the operation of both the throttle and clutch in an engine of comparatively small power such as engine for motorboat from the viewpoint that it is quite economical in manufacturing and quite reliable owing to the simple construction comprising trouble-free parts.

7 Claims, 6 Drawing Figures

CONTROL MECHANISM

BACKGROUND OF THE INVENTION

The present invention relates to a novel and improved control mechanism, and more particularly to a mechanism for controlling both the clutch and throttle of an engine such as a marine engine, by a single lever.

Control mechanisms of the type which employ a single lever need to be readily operable and free from troubles even where unskilled persons are concerned and must also fulfill the essential requirements of being so adapted that the throttle is held out of operation until the clutch or engine is completely shifted and must have a construction such that the clutch is always held in the shifted position thereof during a operation of the throttle. Further, economy is another essential requirement in addition to the security and operability when applying it to an engine of comparatively small power, such as motorboat engine.

However, none of the control mechanisms hitherto known can fully comply with these requirements.

OBJECTS OF THE INVENTION

It is an object of the present invention to provide a novel and improved control mechanism for controlling the operation of both the clutch and throttle of an engine by a single main lever.

Another object of the invention is to provide a control mechanism which assures that the throttle is held out of operation until the clutch is completely shifted, while the clutch is held in the shifted position thereof during the operation of the throttle.

A further object of the invention is to provide a control mechanism which is very simple in construction, operable without any trouble and economical in manufacturing.

Other objects and advantages of the invention will become apparent from the following description of embodiments with reference to the accompanying drawings.

DETAILED DESCRIPTION

It has now been found that tnese objects can be achieved by a control mechanism comprising a lever means having a rotatable shaft; a clutch operating means having a clutch member and a sliding member and being formed with an elongated hole through which the shaft extending, the clutch operating means being rotatable around the shaft and slidable along the elongated hole while contacting with the shaft; a throttle operating means having a throttle member and a sliding member; and a standing means having a standing clutch guide means comprising a circular portion formed on a circular arc which is concentric with the shaft and two radially inclined portions extending from opposite ends of the circular portion, along which the sliding member of the clutch operating means slide, and a standing throttle guide means, along which the sliding member of the throttle operating means slides; and a rotatable means, rotatable by the lever means, having a rotatable clutch guide means comprising a radially inclined portion and two circular portions extending from opposite ends of the inclined portion and being formed on circular arcs which are concentric with the shaft and different in radius, along which the sliding member of the clutch operating means slides, and a rotatable throttle guide means, along which the sliding member of the throttle operating means slides.

Figure 1:
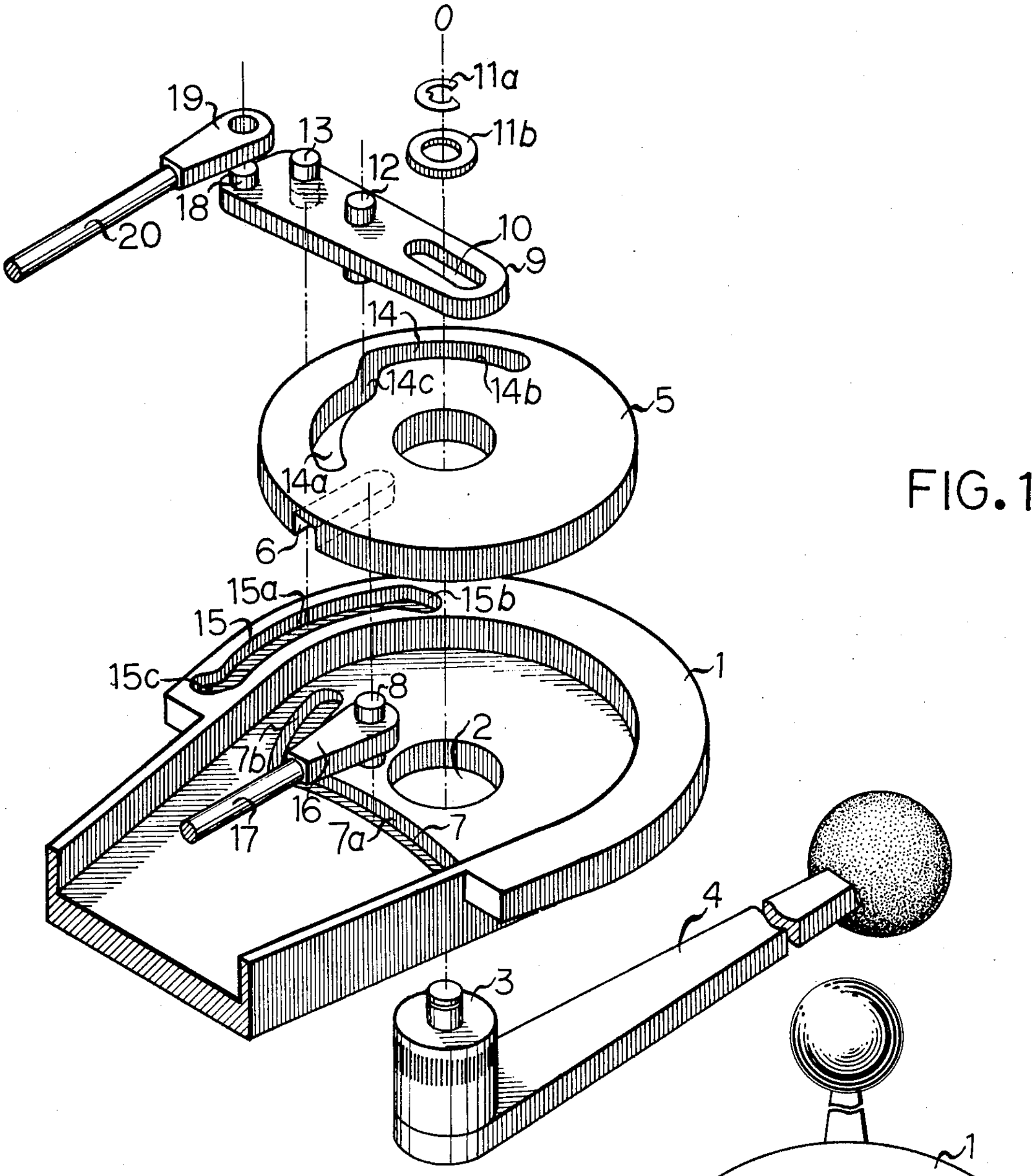
FIG. 1 is a perspective view showing the principal parts of an embodiment of the present invention, and further with positions for production in an assembly line.

A preferred embodiment of the present invention will be described by way of example only with reference to the accompanying drawings in which;

With respect to FIG. 1, a main lever 4 is mounted in a fixed manner on a rotatable shaft 3 rotatably supported by a casing 1. A rotatable means or rotatable plate 5 is fixedly mounted on the shaft 3 and rotatable by the main lever 4. The rotatable plate 5 is formed with a rotatable throttle guide means or rotatable throttle guide slot 6 formed radially relative to the center 0. The casing 1 is formed with a standing throttle guide means or standing throttle guide slot 7 which is in the shape of a channel section as best shown in FIGS. 3A, 3B, 3C and 3D. A throttle operating means has a sliding member or pin 8 inserted slidably in both slots 6 and 7.

The rotatable plate 5 is also formed with a rotatable clutch guide means comprising a radially inclined portion or inclined slot **14*c* and two circular portions or circular slots 14*a* and 14*b* extending from the opposite ends of the inclined slot 14*c* and being formed on circular arcs which are concentric with the shaft 3** but different in radius.

The casing 1 is also formed with a standing clutch guide means or standing clutch guide slot 15 comprising a circular portion or circular slot **15*a* formed on the circular arc which is concentric with the shaft 3 and two inclined portions 15*b* and 15*c* extending from the opposite ends of the circular slot 15*a*. One of which 15*b*, is formed on a line inclined slightly inwardly relative to the center O and another one 15*c*** is formed on a line inclined slightly outwardly relative to the center O.

These guide means may be formed on the casing 1 or the rotatable plate 5 by welding other parts having slot 6, 7, 14 or 15, which are in the forms described above, to the casing 1 or the rotatable plate 5.

Figure 2:
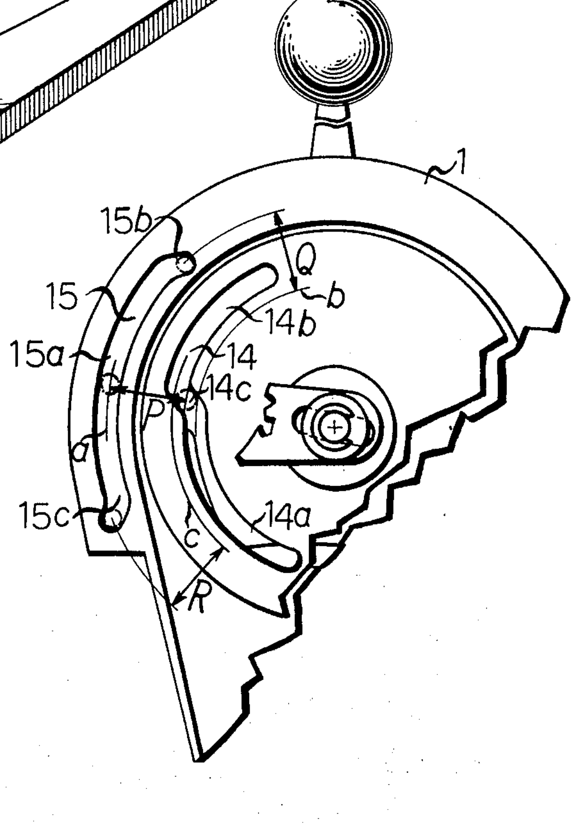
FIG. 2 is a partial elevational view showing relative position of a standing clutch guide means in a standing means and a rotatable clutch guide means in a rotatable means.

The slots 14 and 15 are so arranged, as shown in FIG. 2, that the radial distance P between the central position of the inclined slot **14*c* of the rotatable clutch guide slot 14 in the rotatable plate 5** and the circular arc *a* passing through the center of the circular slot **15*a* of the standing clutch guide 15*c*** is less than both radial distances Q and R between the circular arc *b* passing through the center of the circular slot **14*a* and the end of the inclined slot 15*b*** and between the circular arc *c* passing through the center of the circular slot **14*b* and the end of the inclined slot 15*c***.

A clutch operating means or clutch operating plate 9 has a sliding member or two pins 12 and 13. The pin 12 is inserted slidably in the rotatable clutch guide slot 14 of the rotatable plate 5. The pin 13 is inserted slidably in the standing clutch guide slot 15 of the casing 1.

The clutch operating plate 9 formed with an elongated hole through which the shaft 3 is extending is rotatable around the shaft 3 and slidable along the elongated hole while contacting the shaft 3.

A snap ring, e.g. E ring 11*a* and a ring 11*b* are employed to retain the clutch operating plate 5.

As a result of these constructions for the guide means and pins as mentioned above, as will be clearer from the description hereinafter, the pin 12 is located in the inclined slot 14*c* where the pin 13 is located in circular slot 15*a* of the casing 1 and the pin 12 is located in the circular slot 14*a* of the rotatable plate 5 in case of the pin 13 being retained in position at the inclined slot 15*b* of the casing 1 with rotation of the lever 4 in direction A (shown in FIG. 3*c*). Similarly, the pin 12 is located in the circular slot 14*b* of the rotatable plate 5 where the pin 13 is retained in position at the inclined slot 15*c* of the casing 1 with rotation of the lever 4 in direction B.

The standing throttle guide slot 7 is the shape of a channel section, as mentioned above, comprising a central slot 7*a* and two side slots 7*b* and 7*c*. As also will be clearer from the description hereinafter, the pin 8 is so arranged that it slides along the slot 7*a* only when the pin 13 is moving along the circular slot 15*a*, and it slides along the slide slot 7*b* when the pin 13 is retained in position at the inclined slot 15*b*. Further, the pin 8 slides along the side slot 7*c* when the pin 13 is retained in position at the inclined slot 15*c*.

A throttle operating means comprises the pin 8 and a clasp 16 pivoted thereto and equipped with the throttle member or throttle shaft 17 which operates the throttle of engine (not shown).

The clutch operating plate 9 is equipped with a pin 18 and a clasp 19, pivoted thereto, having a clutch member or clutch shaft 20 which operates the clutch of engine (not shown).

The operation of the embodiment of the invention will now be described with respect to FIGS. 3A, 3B, 3C and 3D.

Figure 3A:
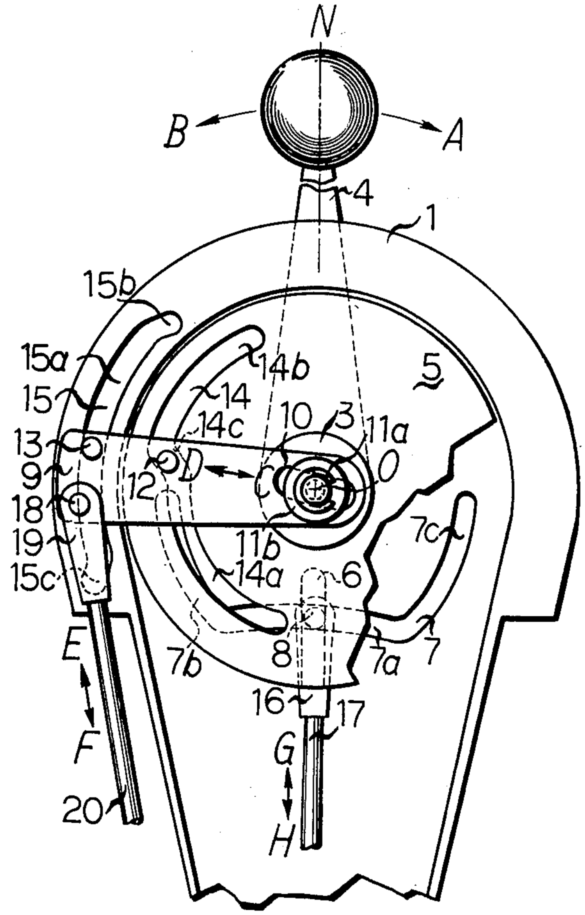
FIGS. 3A, 3B, 3C and 3D are elevational views showing various steps of operation.

In the neutral position N, as shown in FIG. 3A, the pin 12 is engaged with the sides of the inclined slot 14*c* of the rotatable clutch guide slot 14 in the rotatable plate 5, while the pin 13 is located in proximately to the central position of the circular slot 15*a* of the standing clutch guide slot 15 in the casing 1. The sides of the slot 15*a* prevent the radial movement of the pin 13. In the mean time, the pin 8 of the throttle operating means is located in the neighborhood of the central position of the central slot 7*a* of the standing throttle guide slot 7 in the casing 1.

The main lever 4 equipped with shaft 3, when turned in direction A from neutral position N, rotates the rotatable plate 5, fixed on the shaft in direction A, while turning the clutch operating plate 9 in direction A by means of the pin 12 which is engaged with the sides of inclined slot 14*c* of the rotatable clutch guide slot 14 in the rotatable plate 5. Consequently, the clutch shaft 20 rotatably supported by the clutch operating plate 9 is pulled in direction E and shifts the clutch, for exampie, into the forward position. With further rotation of the clutch operating plate 9, the pin 13 is moved from the circular slot 15*a* in the casing 1 into the inclined slot 15*b* extending from the end of the slot 15*a*. The clutch operating plate 9 equipped with the pin 12 is moved toward the center O (in direction C), and the pin 12 fixed at the clutch operating plate 9 is also moved from the inclined slot 14*c* into the circular slot 14*a* of the rotatable plate 5. Prior to the completion of these movements, the clutch has been completely shifted.

Figure 3B:
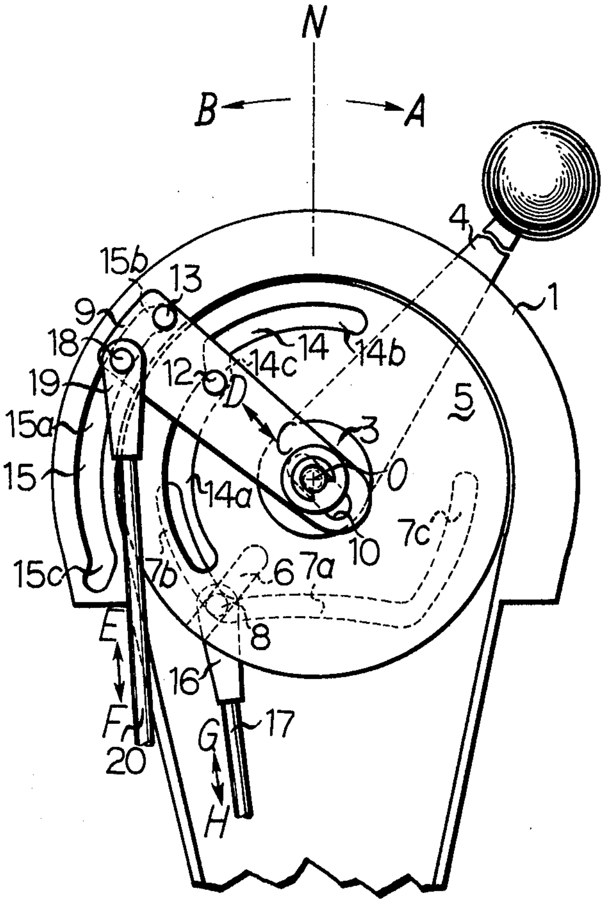

At the same time, the pin 8, being shifted by the slot 5 which is formed relative to the rotating center of the rotatable plate 5, has been located at the adjacent end of the slot 7*a* of the casing 1, as shown in FIG. 3B.

Figure 3C:
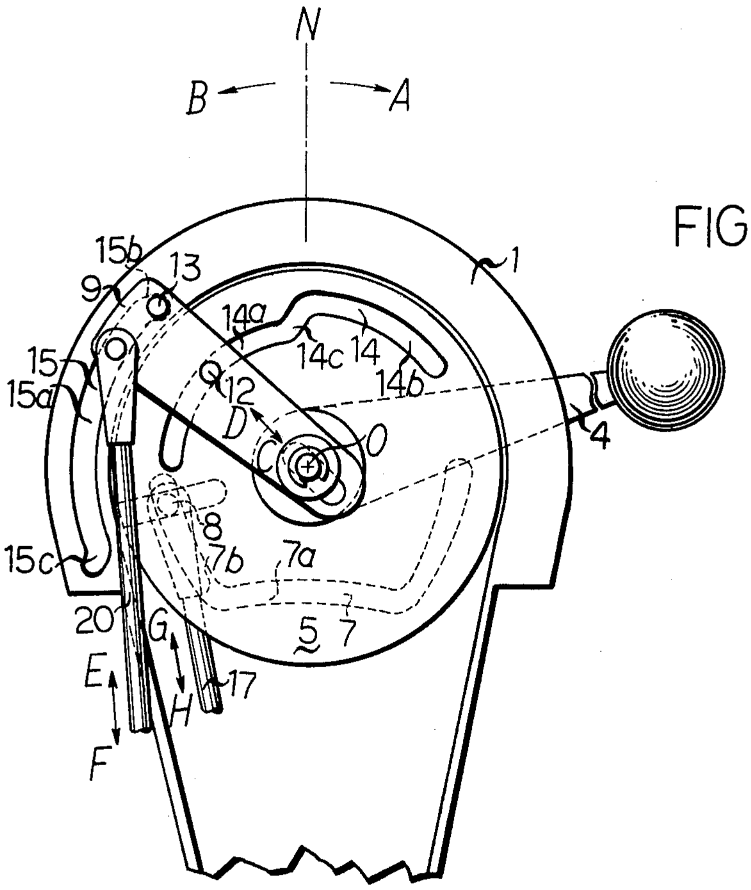

As shown in FIG. 3C, since the pin 12 has already been inserted into the circular slot 14*a*, the lever 4 secured together with the rotatable plate 5 is further rotatable in direction A without being restricted by the pin 12. The pin 8, being pushed out of the central slot 7*a* and inserted into the side slot 7*b* by the side of the rotatable throttle guide slot 6, is pulling the throttle shaft 17 in direction G, which results in advancing the throttle to thereby drive the boat forward at high speed.

With the pin 13 so adapted that it is locked in the inclined slot 15*b* by means of the upper side of the circular slot 14*a* which is preventing the radial movement of the pin 12, the clutch operating plate 9 is at a standstill during the operation of the throttle along the side slot 7*b*.

Rotating the lever 4 in reverse, the pin 12 of the clutch operating plate 9, after the time when it slides along the circular slot 14*a*, is moved radially outward by the side of the inclined slot 14*c* and is moved into the inclined slot 14*c*.

The clutch operating plate 9 equipped with the pin 12 is also moved in direction D, and the locked pin 13 fixed on the plate 9, being displaced from the inclined slot 15*b* into the circular slot 15*a*, is released. Concequently, the clutch operating plate 9 is operable in reverse by the pin 12 which is engaged with the sides of the inclined slot 14*c* of the rotatable plate 5.

Figure 3D:
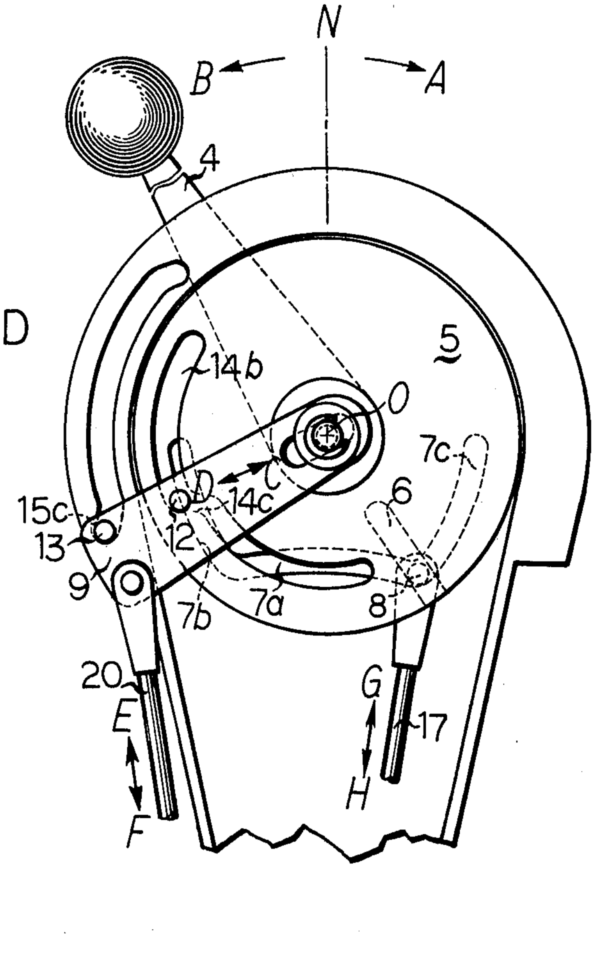

As shown in FIG. 3D, the main lever 4, when turned in direction B from neutral position N, rotates the rotatable plate 5 in direction B, while also turning the clutch operating plate 9 in direction B by means of the pin 12 is engaged with the sides of the inclined slot 14*c*. Consequently, the clutch shaft 20, which is supported at the clutch operating plate 9, is pushed in direction F and shifts, for example, into the reverse position. In the same manner as described above, the pin 12 is able to slide along the circular slot 14*b* as a result of the movement of the clutch operating plate 9 in direction D at the position relating to the inclined slot 15*c* of the casing 1.

Rotating the lever 4 in direction B, the pin 8, being pressed by the side of the rotatable guide slot 6 and moved from the central slot 7*a* into the side slot 7*c*. pulls the throttle shaft 17 in direction G. Accordingly, the throttle is advanced to some extent and to thereby drive the boat in reverse at some predetermined speed.

Thus the advancement of the throttle is minimized where the pin 8 is located at the central slot 7*a*, and the advancement thereof is gradually increased in accordance with the increase in the distance movement in of the pin 8 equipped with the throttle shaft 17 along the slot 7*b* or 7*c* after the completion of the clutch shift into the forward or reverse position.

Since the guide slot 7 is in a form of a channel section, the radial distance between the center O and the pin 8 varies during the sliding operation of the pin 8 along the guide slot 7. However, since the rotatable throttle guide slot 76 with which the pin 8 comes in contact is in the shape of an elongated slot formed relative to the center O, the movement of the pin 8 is not subjected to restriction.

It is evident from the aforesaid description that this control mechanism can operate the clutch and throttle of an engine by a single main lever assuring that the throttle is held out of operation until the clutch is completely shifted. Then the throttle is able to be advanced freely after the completion of shift of the clutch.

When the throttle is in operation, that is to say, where the pin 8 is located in the side slot *7b* or *7c* of the standing throttle guide slot 7, the clutch operating plate 9 equipped with the clutch shaft 20 is locked against turning because of the pin 13 being located in the inclined sot 15*b* or 15*c* and the radial movement of the pin 12 which is located in the circular slot 14*a* or 14*b* being restricted by the sides thereof. Therefore, the operation is quite safe and secure since the clutch is held in the shifted position thereof during the operation of the throttle.

Although the mechanism of the present invention is applicable in many fields for controlling the operation of two elements of a machine, the mechanism of the present invention has particular relevance to controlling the operation of both the throttle and clutch in an engine of comparatively small power such as an engine for motorboats, from the viewpoint that it is quite economical of manufacture and quite reliable owing to the simple construction comprising trouble-free parts.

Preferably, the sliding member or the pin 8, 12 and 13 is equipped with rollers (not shown) at each portion contacting the guide slots 6, 7, 14 and 15 to eliminate resistance due to friction therebetween.

Each guide means can be formed in any suitable shape, including that of an elongated projection, or the like.

The connecting arrangement for connecting the clutch shaft 20 to the clutch operating plate 9 may be so constructed that the radial distance between the center O and the connecting position is adjustable (not shown) to change the operating stroke of the clutch shaft. The casing 1 may be equipped with an additional standing throttle guide means which has a different distance from the center O (not shown) to change the operating stroke of the throttle shaft.

The central portion *7a* of the throttle guide slot 7 is formed on the circular arc, the center of which is the same as that of the swaying center (not shown, but which can be readily understood by FIGS. 3A, 3B, 3C and 3D) such that the throttle shaft 17 is not to advance the throttle in the course of passing along the slot *7a*, and may be formed on the straight line where initial operation of the throttle is not so objectionable.

Differing from the aforementioned embodiment, the channel section-shaped slot 7 may be formed in the rotatable plate 5 instead of being formed in the casing 1, and the elongated slot 6, accordingly, may be formed in the casing 1. In the above instance, although the stroke of the throttle shaft 17 is limited to the distance of movement obtained by substracting the minimum distance from the maximum distance between the center O and the each position of the channel section-shaped slot, the throttle shaft is beneficially pulled longitudinally without being subjected to a swaying motion at its end.

Further the sliding member of the clutch operating plate 9 may consist of a single pin instead of employing two pins 12 and 13 by so arranging the structure that the radial distance P (shown in FIG. 2) between the center position of the inclined sot 14*c* of the rotatable plate 5 and the circular arc *a* passing through the center of the circular slot 15*a* of the casing 1 is substantially zero (not shown).

Furthermore, instead of empoying two parts (a lever 4 and a rotatable plate 5), as can be readily understood by a person skilled in the art, the integral member formed by incorporating the lever 4 into the rotatable plate, wherein the lever is extending from a portion of the rotatable plate, may be mounted rotatably on the casing 1 by means of a shaft.

Besides, an additional member which is mounted in a fixed manner on a casing 1 may be available as a standing means.

The inner wire of control cable, or the like which can support pushing and pulling forces can be adaptable as a throttle member and/or clutch member 20 as well as an ordinary steel shaft. The wire which can endure only pulling force is also available for the throttle by employing a spring which pulls the throttle at any time.

It will be understood that the embodiment of the invention herewith shown and described is a preferred example and that various modifications may be carried out without departing from the spirit of the present invention or the scope thereof.

What we claim is:

1. A control mechanism for controlling the operation of both the clutch and throttle of an engine by a single main lever which comprises:

a lever means having a rotatable shaft;

a clutch operating means having a clutch member and a sliding member and being formed with an elongated hole through which the shaft extend, said clutch operating means being rotatable around the shaft and slidable along the elongated hole while contacting the shaft;

a throttle operating means having a throttle member and a sliding member;

a standing means having a standing clutch guide means comprising a circular portion formed on a circular arc which is concentric with the shaft and two radially inclined portions extending from opposite ends of the circular portion, along which the sliding member of the clutch operating means slides, and a standing throttle guide means, along which the sliding member of the throttle operating means slides; and a rotatable means, rotatable by the lever means, having a rotatable clutch guide means comprising a radially inclined portion and two circular portions extending from opposite ends of the inclined portion and being formed on circular arcs which are concentric with the shaft and differ in radius, along which the sliding member of the clutch operating means slides, and a rotatable throttle guide means, along which the sliding member of the throttle operating means slides.

2. The control mechanism as claimed in claim 1, wherein said sliding member of the clutch operating means consists of two pins, one of which is slidably inserted in the rotatable clutch guide means and another of which is slidably inserted in the standing clutch guide means.

3. The control mechanism according to claim 1, wherein sliding member of the clutch operating means consists of a single pin which is slidably inserted both in the rotatable clutch guide means and in the standing clutch guide means by so arranging the structure that a radial distance between a central position of the inclined portion of the rotatable clutch guide means and the circular arc passing through the center of the circular portion of the standing clutch guide means is substantially zero.

4. The control mechanism according to claim 1, wherein said rotatable throttle guide means of the rotatable means is formed relative to the rotating center of the rotatable means and said standing throttle guide means of the standing means is formed in the shape of a channel section which has a central portion formed on a circular arc.

5. The control mechanism according to claim 1, wherein at least one sliding member selected from the group consisting of the sliding member of the clutch operating means and the sliding member of the throttle operating means has a roller at each portion in contact with the corresponding guide means.

6. The control mechanism according to claim 1, wherein at least one guide means selected from the group consisting of the standing clutch guide means, the standing throttle guide means, the rotatable clutch guide means and the rotatable throttle guide means is formed in the shape of an elongated slot.

7. The control mechanism according to claim 4, wherein said circular arc, on which the central portion of the channel section is formed, has the same center as that around which the throttle member evolves.

* * * * *